(12) United States Patent
Kehoe et al.

(10) Patent No.: US 9,868,056 B2
(45) Date of Patent: Jan. 16, 2018

(54) GAME CREATION SYSTEMS WITH SOCIAL REPORTING ENGINE

(71) Applicant: ZCO, LLC, Minneapolis, MN (US)

(72) Inventors: Daniel G. Kehoe, Atlanta, GA (US); David Sanchez Escobar, Bogata (CO); Jason Ferguson, Duluth, GA (US); Matthew Bryan Moseley, Hilton Head Island, SC (US); Andrew Rutter, Roswell, GA (US)

(73) Assignee: ZCO ACQUISITIONS, INC., Minneapolis, MN (US)

( * ) Notice: Subject to any disclaimer, the term of this patent is extended or adjusted under 35 U.S.C. 154(b) by 0 days.

(21) Appl. No.: 14/888,090

(22) PCT Filed: Apr. 30, 2014

(86) PCT No.: PCT/US2014/036235
§ 371 (c)(1),
(2) Date: Oct. 29, 2015

(87) PCT Pub. No.: WO2014/179490
PCT Pub. Date: Nov. 6, 2014

(65) Prior Publication Data
US 2016/0082348 A1    Mar. 24, 2016

Related U.S. Application Data (60) Provisional application No. 61/818,028, filed on May 1, 2013.

(51) Int. Cl.
*A63F 13/23* (2014.01)
*G06Q 10/10* (2012.01)
(Continued)

(52) U.S. Cl.
CPC .............. *A63F 13/23* (2014.09); *A63F 13/35* (2014.09); *A63F 13/46* (2014.09); *A63F 13/65* (2014.09);
(Continued)

(58) Field of Classification Search
CPC .............................. A63F 13/23; A63F 13/798
(Continued)

(56) References Cited

U.S. PATENT DOCUMENTS 4,501,425 A    2/1985  Alvarado
5,846,132 A   12/1998  Junkin
(Continued)

FOREIGN PATENT DOCUMENTS

WO    2012125131 A1    9/2012

OTHER PUBLICATIONS

International Preliminary Report on Patentability rendered by the International Bureau of WIPO for PCT/US2014/036235, dated Nov. 12, 2015, 7 pages.
(Continued)

*Primary Examiner* — David L Lewis
*Assistant Examiner* — Shauna-Kay Hall
(74) *Attorney, Agent, or Firm* — Skaar Ulbrich Macari, P.A.

(57) ABSTRACT

Interactive systems and methods for creating game and game-like applications are presented. A game system includes a content management system with access to game templates and a game content database, a plurality of REST application services, one or more user interfaces, an active game-play database, and a social reporting engine for collecting and storing user data in a user database. The game creation system includes access to external data feeds for tracking the progress and outcome of real-world events, such as sporting events. Games may be built using an
(Continued)

editorial workflow interface for approving or rejecting game templates and game content. A crowd wisdom module analyzes game play and identifies the best answers over time, and a crowd guru module identifies players who perform well over time.

18 Claims, 1 Drawing Sheet

(51) Int. Cl.
*G06Q 50/00* (2012.01)
*A63F 13/798* (2014.01)
*A63F 13/65* (2014.01)
*A63F 13/35* (2014.01)
*A63F 13/795* (2014.01)
*A63F 13/46* (2014.01)
*A63F 13/828* (2014.01)

(52) U.S. Cl.
CPC .......... *A63F 13/795* (2014.09); *A63F 13/798* (2014.09); *A63F 13/828* (2014.09); *G06Q 10/101* (2013.01); *G06Q 50/01* (2013.01)

(58) Field of Classification Search
USPC .......................................................... 463/31
See application file for complete search history.

(56) References Cited

U.S. PATENT DOCUMENTS

| | | | |
|---|---|---|---|
| 5,860,862 A | 1/1999 | Junkin | |
| 7,762,878 B2 | 7/2010 | Nicholas | |
| 7,988,560 B1 | 8/2011 | Heller | |
| 8,029,289 B2 | 10/2011 | Neel | |
| 8,099,182 B1 | 1/2012 | Kasten | |
| 8,105,159 B2 | 1/2012 | Wojewoda | |
| 8,167,712 B2 | 5/2012 | Sarkar | |
| 8,176,518 B1 | 5/2012 | Junkin | |
| 8,202,149 B2 | 6/2012 | Gedling | |
| 8,206,214 B2 | 6/2012 | Wojewoda | |
| 8,210,918 B2 | 7/2012 | Nicholas | |
| 8,246,433 B2 | 8/2012 | Lore | |
| 8,292,725 B2 | 10/2012 | Wikander | |
| 8,315,722 B1 | 11/2012 | Russo | |
| 8,337,310 B1* | 12/2012 | Bjordahl ............. G07F 17/3274 463/25 |
| 8,340,794 B1 | 12/2012 | Trdinich | |
| 8,371,916 B2 | 2/2013 | Nicholas | |
| 8,403,756 B2 | 3/2013 | Baray | |
| 8,447,420 B2 | 5/2013 | Bloodworth | |
| 8,460,078 B2 | 6/2013 | Moore | |
| 8,465,369 B2 | 6/2013 | Dokei | |
| 8,475,249 B2 | 7/2013 | Belmarch | |
| 8,509,929 B1 | 8/2013 | Hughes | |
| 8,512,148 B2 | 8/2013 | Butz, Jr. | |
| 8,538,563 B1 | 9/2013 | Barber | |
| 8,548,611 B2 | 10/2013 | Ahlstrom | |
| 8,568,236 B2 | 10/2013 | Baray | |
| 8,572,498 B2 | 10/2013 | Braun | |
| 2005/0261043 A1 | 11/2005 | Slade | |
| 2007/0185599 A1 | 8/2007 | Robinson et al. | |
| 2007/0233585 A1 | 10/2007 | Ben Simon | |
| 2008/0064488 A1 | 3/2008 | Oh | |
| 2008/0102911 A1 | 5/2008 | Campbell | |
| 2008/0125228 A1 | 5/2008 | Ware | |
| 2008/0153589 A1 | 6/2008 | Baray | |
| 2008/0161113 A1 | 7/2008 | Hansen | |
| 2009/0270155 A1* | 10/2009 | Glass .................. G07F 17/3288 463/16 |
| 2010/0184495 A1 | 7/2010 | Levy et al. | |
| 2011/0053681 A1 | 3/2011 | Goldman et al. | |
| 2011/0237317 A1 | 9/2011 | Noonan | |
| 2011/0306427 A1 | 12/2011 | Pawson | |
| 2011/0319171 A1 | 12/2011 | Ngozika | |
| 2012/0115554 A1 | 5/2012 | Cairns et al. | |
| 2012/0129610 A1 | 5/2012 | Mazursky et al. | |
| 2012/0142411 A1 | 6/2012 | Thompson | |
| 2012/0149472 A1 | 6/2012 | Miller | |
| 2012/0172112 A1 | 7/2012 | Sklanka et al. | |
| 2012/0202599 A1 | 8/2012 | Cohen | |
| 2012/0220375 A1 | 8/2012 | Williams | |
| 2012/0231890 A1 | 9/2012 | Junkin | |
| 2012/0289340 A1 | 11/2012 | Pawson | |
| 2012/0316659 A1 | 12/2012 | Magas | |
| 2012/0330444 A1 | 12/2012 | Sloan | |
| 2013/0017874 A1 | 1/2013 | Trdinich | |
| 2013/0053147 A1 | 2/2013 | Miller | |
| 2013/0053989 A1 | 2/2013 | Miller | |
| 2013/0072307 A1 | 3/2013 | Heller | |
| 2013/0079130 A1 | 3/2013 | Takacs | |
| 2013/0245797 A1 | 9/2013 | Moore | |
| 2013/0260847 A1 | 10/2013 | Amaitis et al. | |
| 2013/0260898 A1 | 10/2013 | Pepe | |
| 2013/0267313 A1 | 10/2013 | Belmarch | |
| 2013/0344964 A1 | 12/2013 | Sloan et al. | |
| 2014/0045595 A1 | 2/2014 | Baschnagel, III | |
| 2014/0121013 A1 | 5/2014 | Carson et al. | |
| 2014/0162771 A1 | 6/2014 | Kurdimov | |
| 2014/0228119 A1* | 8/2014 | Koenig .................. A63F 13/12 463/32 |
| 2014/0274245 A1 | 9/2014 | Stickel | |
| 2014/0287831 A1 | 9/2014 | Relyea et al. | |
| 2014/0329584 A1 | 11/2014 | Thompson | |

OTHER PUBLICATIONS

International Search Report rendered by the International Searching Authority for PCT/US2014/036241, dated Sep. 4, 2014, 2 pages.
The extended European Search Report rendered by the European Patent Office for PCT/US2014/036235, dated Jan. 19, 2017, 7 pages.

\* cited by examiner

GAME CREATION SYSTEMS WITH SOCIAL REPORTING ENGINE

CROSS-REFERENCE TO RELATED APPLICATIONS

The present application claims the benefit of and priority to U.S. Provisional Application 61/818,028, filed May 1, 2013, entitled "Game Creation and Insertion Systems and Methods, With Integrated Data Capture and Social Reporting Engine," which is herein incorporated by reference in its entirety.

TECHNICAL FIELD

Certain disclosed embodiments relate to the field of game creation systems and, in particular, to a system for deploying interactive games with a social reporting engine and related methods.

BACKGROUND

Computer-implemented games and game-like interactive systems are expensive and time-consuming for developers to design, create, and deploy. In addition to the work of designing and creating a game, preparing a game for deployment and use represents a significant technical challenge because users today play games on a wide variety of devices. Thus, there is a need in the art for improved game creation systems and methods.

SUMMARY

In some embodiments, an interactive system for a plurality of game-like activities includes: a content management system comprising a plurality of game templates, a game content database in communication with a plurality of external data services; a plurality of application services, in communication with the content management system, comprising one or more game-like applications; one or more user interfaces to facilitate access to the plurality of application services for a plurality of users; and a social reporting engine, in communication with the content management system, for collecting and storing user data, including demographic facts and game-play behavior, for at least a first subset of the plurality of users during a predetermined subset of interactions with the plurality of application services. The user interfaces may include: (a) a first user interface for selecting a first game template from the plurality of game templates; (b) a second user interface for selecting a first set of game content from the game content database; and (c) a third user interface for deploying a first game-like application by inserting the first set of game content into the first game template.

The plurality of application services may further include a query tool for searching the plurality of external data services for additional game content and for importing the additional game content into the game content database.

The plurality of application services may further include an active game-play database, in communication with the third user interface, for storing interactions with the first game-like application.

The social reporting engine may further include a type profile application for classifying the first subset of the plurality of users into one or more consumer type profile groups according to the user data.

The social reporting engine may further include a business intelligence reporting console for designing reports about the user data, for secure access by one or more authorized users, and for filtering the reports according to one or more selected criteria.

The social reporting engine may further include a predictive application for analyzing predictions and outcomes for the first subset of the plurality of users, comparing the predictions and outcomes to one or more other users.

The social reporting engine may further include a crowd wisdom module for analyzing and ranking predictive answers, by subject, over a predetermined time period, in order to identify a wisest subset of the predictive answers and report the wisest subset to a customer.

The social reporting engine may further include a crowd guru module for analyzing and ranking predictive answers, by user and by subject, over a predetermined time period, in order to identify an expert subset of users who are entering the wisest subset of the predictive answers and report the expert subset to a customer.

The second user interface may further include a content query tool for searching the game content database.

The user interfaces may further include an administrative portal for managing, customizing, scoring, or updating the first game-like application.

The plurality of application services may further include a leaderboard module for displaying a list of users, by score, for a particular set of games selected from the one or more game-like applications;

The plurality of application services may further include a game generation module configured to automatically develop ready-to-use programming code suitable for use on any of a variety of devices or platforms.

The user interfaces may further include an editorial workflow interface for presenting (a) one or more candidate game templates, selected from the plurality of game templates, or (b) one or more candidate game content items, selected from the game content database, for approval or rejection by one or more authorized game editors.

The plurality of game templates may include a product game for educating a user about a product, informing the user about a warranty for the product, leading the user through an installation process for the product, leading the user through a particular use of the product, or registering the product.

Other apparatuses, methods, systems, features, and advantages of the disclosed embodiments will be apparent to one of ordinary skill in the art upon examination of the following figures and detailed description, or may be learned by practicing. All such additional apparatuses, methods, systems, features, and advantages are intended to be included within this description and to be included within the scope of the accompanying claims. The descriptions herein are not restrictive, but instead are exemplary and explanatory only.

BRIEF DESCRIPTION OF THE DRAWING

Reference will now be made to the accompanying drawings, which are not necessarily drawn to scale, and wherein.

DETAILED DESCRIPTION OF PARTICULAR EMBODIMENTS

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Games

As used herein, the term games refers to activities undertaken for play or amusement, as well as game-like interactive activities that are used to facilitate the pursuit of a specific object or purpose. In a broad sense, the games described herein enable users to interact with both the game content itself and with game-related insertions or requests (sometimes referred as calls to action). As described, the games and game-like interactive systems herein, including the game systems for creating supersets of games, provide deeper engagement between the user and the game. As used herein, user engagement refers to the frequency of play, duration of play, and the depth of interaction with game content and/or calls to action. Deeper user engagement increases the value of games, especially in the commercial context.

Although the systems and methods described herein are discussed in the context of game creation and insertion systems, and methods of capturing user data, the technology disclosed herein is also useful and applicable in a variety of other contexts.

According to particular embodiments, the game systems and methods described herein provide a software platform that automates the creation, customization, deployment, and management of games, game widgets, game overlays, game insertions, and game applications using a self-service user interface that can be offered on a SaaS platform (delivered as a hosted service). All these tasks can be performed by users with no programming or technical skills. The process of creating a game is automated because the system presents a variety of game types and templates to the user. Each game is fully customizable because the game system includes an extensive library of free content, as well as a tool for searching and importing game-related content. Deployment across any of a variety of devices and platforms is automated because the game system automatically builds ready-to-use code for deploying the game on a web page, a Facebook page, an iOS device (including iPhone, iPad, iPod Touch, and the like), an Android-based device, or any of a variety of other platforms. Games may be customized, deployed, scored, updated, and otherwise managed using an Administrative ("Admin") portal. For example, games can be open to the public or limited to a private group, such as friends, clubs, teams, business units, targeted consumers, or any of a variety of sets of people or entities.

Games created and managed by the game system described herein are lower in cost, faster to deploy, and easier to manage than those produced by existing game systems. The game system described herein also drives deeper user engagement with game content and calls to action, including customer-created content and customer-designed calls to action.

System

Figure 1:
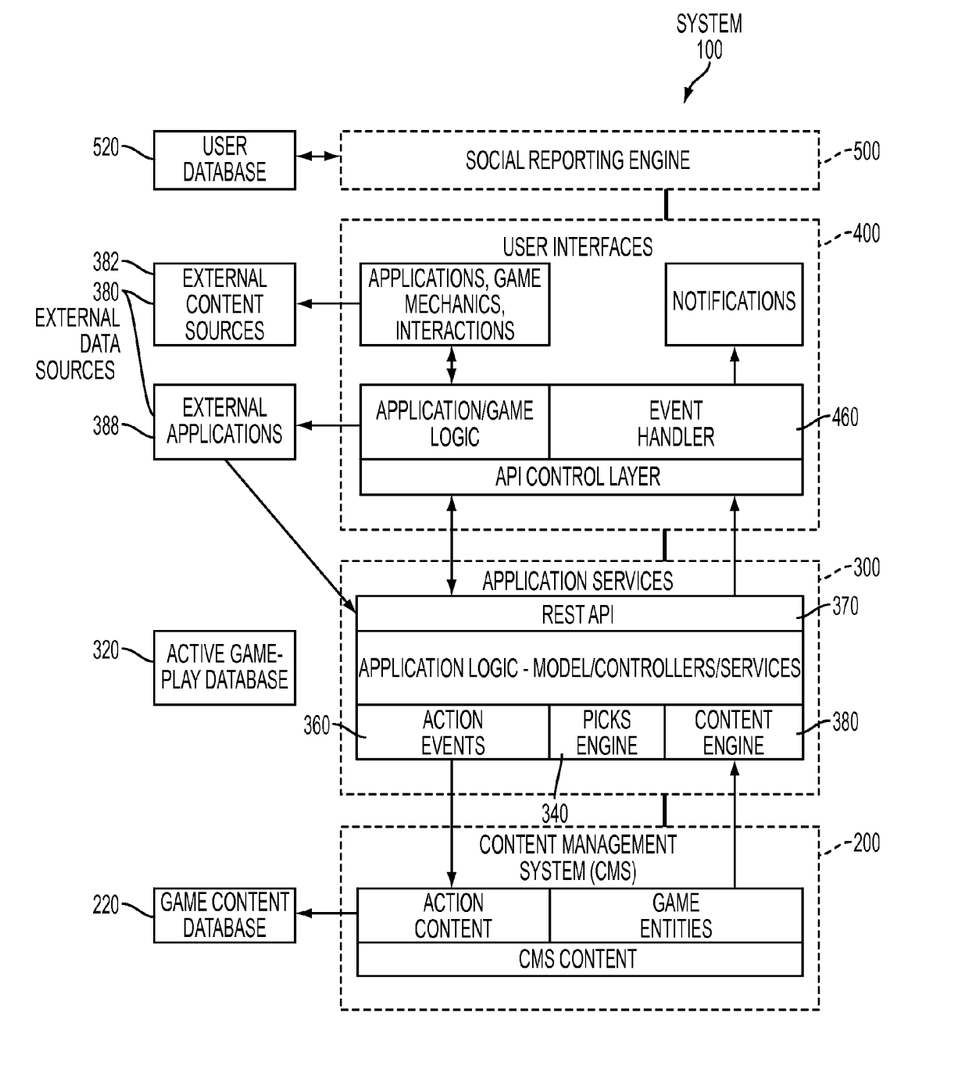
FIG. 1 is a schematic illustration of a system for game creation and management, shown in one exemplary platform architecture, according to particular embodiments.

FIG. 1 is a schematic illustration of a system 100 for game creation and management, according to particular embodiments. As shown, the system 100 may include a variety of elements in communication with one another, including a content management system 200, application services 300, user interfaces 400, and a social reporting engine 500. The system 100 may also include a game content database 220, an active game-play database 320, a user database 520, and external data sources 380. The external data sources 380 may include external content sources 382 and external applications 388.

FIG. 1 also illustrates a system platform architecture, according to particular embodiments. The game systems and methods described herein may be provided using a self-service platform that facilitates the creation and management of games through a friendly set of user interfaces 400. The system architecture, according to particular embodiments, may include the components and modules illustrated in FIG. 1.

The user interfaces 400 may include a system of presenting model games or game templates to the user, with drag-and-drop capability so that the user can create a customized game and arrange the game content as desired. The user may elect to copy an existing game from within the system and then customize it, if desired. In one aspect, a user can perform these tasks with no programming or technical skills, and can manage virtually all the game content, insertions, and calls to action, as well as the look and feel of the game, the complexity and duration of the game, and the details of scoring and reporting the results.

The user interfaces 400, according to particular embodiments, may include a first user interface for selecting a first game template. The CMS 200, as shown in FIG. 1, may include a variety of content including a variety of game templates. As part of the process of building a game or a game-like application, the user interfaces 400 may also include a second user interface for selecting a first set of game content; for example, from the game content database 220. A third user interface may be used for deploying the game—by inserting the first set of game content into the first game template. In this aspect, the user gathers content for use within a particular game content and then deploys the game for play.

In another aspect, the user interfaces 400, according to particular embodiments, may include an editorial workflow interface for use with building a game. The interface may used to present game templates and/or game content, for approval or rejection, by one or more authorized game editors. The authorized game editors may be game system designer, game providers, selected users, the user who created the game, designated personnel with Admin authorization for a game or game system, or any other subset of users or game players. In this aspect, the game creation and publishing activity may be controlled and regulated in a way that is similar to other types of content publishing.

Synchronization

As illustrated in FIG. 1, the system 100 in particular embodiments includes a game content database 220 and an active game-play database 320. After a game or game-like application is created, reviewed, and formally published, the game and its contents, according to particular embodiments, may be transferred from the game content database 220 to the active game-play database 320; thereafter, the application services monitor, control, and manage active game play. In this aspect, the game system provides one-way synchronization, from the game content database 220 to the active game-play database 320. Synchronization creates a challenge when, for example, there is an inconsistency or data flaw in a published game that has been published and activated to the active game-play database 320.

Synchronization is more challenging in systems, like the game system of the present invention, which allow unskilled users to create and manage games. To provide for closely coordinated synchronization, the game system according to particular embodiments includes a set of limits, user permissions, user policies, and a variety of other controls on the depth of access permitted for authorized users, game players, and Admin personnel. In this aspect, the game system protects the game content by limiting the permissions and access granted to particular users.

In another aspect, the game system may be assigned a status in each database, for each game. For example, each game may be assigned a Game Content Status associated with the game's condition relative to the Game Content database 220, and an Active Game Status associated with the game's condition relative to the Active Game-play database 320. The game system, according to particular embodiments, coordinates (but does not necessarily match) the Game Content Status and the Active Game Status for each game, at a particular time. For example, in the event a flaw is discovered, the Active Game Status may be updated to "inactive" and the Game Content Status may be coordinated to "under review" while the game is being corrected or otherwise updated. In this aspect, the two status indicators are coordinated by the game system, in order to facilitate proper synchronization.

The game system may also include a process referred to as a status-validation protocol for validating the status of any game, relative to either database or both databases 220, 320. The status-validation protocol is managed by the game system so that changes or updates in a particular game can be made, the game can be edited and re-published, and the two status indicators can be selectively updated. Also, in the event of database corruption or service interruption, the game system will use database mirrors, backups, recovery sets, roll-back strategies, duplicate databases running in parallel on multiple servers, and other strategies designed to provide uninterruptible service.

Content Engine 350

According to particular embodiments, the system 100 described herein may rely upon any of a variety of different content sources for the games. The game content may be managed at the event level, the question level, the answer level, and/or combinations thereof.

According to particular embodiments, the Content Engine 350, also referred to herein as the prediction engine, includes four main elements—Questions, Answers, Events, and Predictions. The Content Engine 350 may identify an Event to include an entire quiz or game, or a single question. An Answer may includes each of the possible answers in a set; for example, each contestant in a bracket game. A Prediction may include the response given by a user. The term Prediction in this context refers to a "condition" that is capable of being stored. For example, a Prediction may be a condition that is objectively correct (e.g., a trivia answer), a condition that is based on the outcome of a real-world event (e.g., a game winner), a condition of being the most popular selection or favorite based on player responses (e.g., the favorite).

The four elements, as identified and managed by a single and centralized Content Engine 350, are designed to accommodate any type of game—trivia, brackets, popularity, prediction of real-world outcomes, and others. To accomplish this integration, the Content Engine 350 includes a method of establishing and maintaining a set of rules for each element—Questions, Answers, Events, Predictions—and the rules for each element determine the type of inputs and conditions that match the particular game type.

Referring to FIG. 1, the Content Engine 350 in particular embodiments uses a REST API 370 to make calls to independent modules. REST (Representational State Transfer) is a style of software architecture for distributed systems, such as the internet. The Content Engine 350 in particular embodiments uses a REST API 370 in order to allow for improved scalability, control of components and related rules, development of interfaces, and the deployment of additional components.

Because the games, in particular embodiments, are driven by a common core model—the Content Engine 350—the collection of user data, including each user's game responses (in any type of game) and the harvesting of user data (using the Social Reporting Engine) can be configured to interact primarily with the Content Engine 350 to access the data.

Game content may include words, numbers, images, videos, questions, answers, quizzes, riddles, audio clips, graphics, animations, data grids, chat boards, one-to-one messages, one-to-many messages, pop-ups, avatars, text inputs, notifications, forms, and any of a variety of other types of content. Game content may be created by the inventors, by the providers or administrators of this system 100, by customers, by individuals, and/or by groups of individual users. The Admin or other use may create game content by, for example, uploading approved content from a computer into the platform or into a game within a platform;

using the game platform's tool to search online for royalty-free or public-domain content and importing such content for use; or by using royalty-free or public-domain content that is already stored in the game platform's accessible database. In another aspect, the game platform or game system, as described herein, may interactively suggest or propose certain items for use as game content, based on the game category, the user's demographic profile, or other parameters associated with the game currently under development.

In another aspect, the picks engine 340, according to particular embodiments, is configured to present options on a display and enable selections for users to choose. The picks engine 340 may also include rules, limits, and standard data representations for the selections made by users. For example, the picks engine 340 for a bracket-style game may display options to users according to rules and related conditions (whether this user has made a pick or not, for example), and may limit user selections (not allowing picks to be changed once submitted, for example).

Content Generation and Synchronization

According to particular embodiments, the information processed and maintained by the game system described herein may be categorized as either Game-play or Content.

Game-play includes the information the system processes for the game interaction: users, events, questions, answers, predictions, and related elements. Content includes the text, images, media, and other information displayed to the user.

Content, as described above, may originate from a variety of sources, and may be collected and stored in a game content database 220, and may be updated following a synchronization (with an incoming data feed, for example, from one or more external data sources 380) wherein the Content is pushed into active Game-play or otherwise made accessible to users in an interactive environment.

The game system described herein provides different variations for generating content, including but not limited to CMS-based and Feed-based.

According to a Feed-based embodiment, the system 100 includes one or more tools or applications for obtaining, receiving, interpreting, and processing an incoming feed of real-time data from external content sources 382. In this aspect, the game content may be revealed only upon receiving a data feed that indicates a particular event has occurred. For example, an XML data feed may include one or more digital watermarks indicating that an event has occurred (during a live TV broadcast, for example). The game system of the present invention may control the game content, in real time, based on an incoming data feed from an external content source 382, by controlling (for example) when a question becomes available, when related content may be shown, when an answer is known and available, when scoring is possible, and the like. In this aspect, all or part of the game content (questions, answers, events, etc.) may be created—automatically—by the system, based upon and in response to a real-time incoming data feed.

According to a CMS-based embodiment, the system 100 includes a Content Management System (CMS) 200 for selecting and managing the content elements in a game. The CMS user interfaces 400 allow user to create content manually or with assistance from external, third-party applications 388 such as freebase, YQL, Flickr, and the like—including royalty-free and public-domain sources. The game content for a simple bracket game, for example, may include royalty-free stock photographs of widely known consumer products or trademarks. The game content for a more complicated and highly-targeted market research game, for example, may include the creation of custom content (such as new product photographs or video clips, for example) that are selected for publishing using a rigorous editorial-type workflow, controlled by the business user. The CMS 200 uses a component model, which allows a variety of different types of content, from different sources, to be identified, acquired, added to the database, and made available to users. The system 100 and CMS 200, using component model, includes a method of synchronizing disparate content formats into a coherent database of ready-to-use components.

In a CMS-based environment, for example, the game may be a basketball game. The CMS 200 uses a component model, which allows a variety of different types of content, from different sources, to be identified, acquired, added to the database, and made available to users. The content structure is created in the CMS 200, where the user can set game behavior and content on the Event object. Using the interfaces 400, the user may set specific configurations and content for one or more questions. Some fields may be modified or customized using information from external data sources 380.

A first question may be, "Which player will have more rebounds?" The answers to this question need to be set or otherwise established before play begins. For this question, the answer content must include at least player names. A second question may be, "Which team will have more steals?" The answer content must include at least the two team names. The answer content may be set manually, by the user, or set by using external data sources 380 (such as a team roster, or league schedule, for example).

Content definition, according to particular embodiments, may be established using a hierarchical structure: EVENT, QUESTION, ANSWER. For example, an EVENT may have the following attributes: Name, Object Status, Event Status, LockDate, Start Date, Categories. Each QUESTION may have the following attributes: Title, Score. An ANSWER may have the following attributes: Title, Correct, ScoreMultiplier.

Event content objects represent a specific event that must include an event status (pending, in progress, or completed, for example), a starting date, and one or more related categories. The Object Status (disabled, enabled, or delivered, for example) may be used to control when the questions related to the event are available to the user.

An event can have any number of related questions, with each defined as a child node in a hierarchical structure. Answers follow the same relationship as the question. Each answer has an attribute called Correct which defaults to false, and is changed to true as needed.

In this context, the attributes may be used to synchronize events and otherwise control game play. Event content may be created before the occurrence of a real-world event, such as a basketball game. For example, on March 27 at 11:30 a.m., the following event content may be created:

EVENT Name: March Madness Final
Object Status: disabled
Event Status: pending
LockDate: March 29 at 1:00 p.m.
Start Date: April 2 at 9:00 p.m. (The start date is validated to confirm that it takes place in the future, relative to the creation of the event).
Categories: basketball
QUESTION Title: Player with more rebounds? (The question may be created as a child of the Event in the hierarchical structure.) Score: Player Name.
ANSWER Title: Player Name 1, Player Name 2, . . . Player Name N (Each possible answer may be created as a child of the Question in the hierarchical structure.) Correct: Player Name With Most Rebounds.

When the LockDate is reached, all the Event attributes are locked (i.e., cannot be deleted or changed) and the Object Status changes to enabled, and users are then permitted to make predictions (i.e., to submit their chosen answer to the question). The Object Status may remain enabled until the Start Date arrives.

When the Start Date is reached, all the predictions (answers) are locked, and the Event Status changes to in progress.

When the real-world event ends, the Event Status is changed to completed, the correct answer is set, and the Object Status may be changed to delivered.

Scoring

The system 100, according to particular embodiments, takes the result of the predictions and calculates a score for the user, so it can be displayed in a table called the Leaderboard. The application services 300 may include a Leaderboard module for displaying a list of users and scores, for a particular set of games. A base score may be calculated from the number of points assigned for each question. The scoring system may include the steps of receiving a prediction (a selected answer) while in pending status; calculating the points earned for each prediction, based on the points assigned to the specific question; summing the new points and recalculating the new score for each user while, in parallel, adding points instantly when a user performs an action that rewards the user with bonus points from the interface; and calculating the user's current ranking and displaying the user's current titles, badges, custom avatar, or other indicators.

In addition to calculating the base points, the scoring system may be designed to award or grant additional points to a user based on predictions made by designated friends about the same question/event and/or answers entered by the user to questions that are featured, sponsored, or otherwise identified as including an award of additional bonus points. The scoring system may be configured to follow any of a variety of specific scoring rules.

Action Events 360 and the Event Handler 460

The system 100 described herein, according to particular embodiments, includes a component that displays an Action Event 360 when a user performs a specific action during a game, such as making a prediction, entering a selected answer, interacting with a social media network, browsing other games, reviewing the Leaderboard, and the like. These Action Events 360 may include inserted content such as a tutorial, an advertisement, a quiz, an achievement notice (when a badge is earned or a points threshold has been reached, for example), a link or active interaction with a third-party tool or application, and any other of a variety of programmed events associated with the game. In turn, each Action Event 360 may include one or more related events, in a series or set that may be defined using the Content Management System (CMS) 200 as controlled by the user or administrator.

The system 200 in particular embodiments may also include an Event Handler 460, which is a module to manage and otherwise coordinate actions with particular events. The Event Handler 460, in its simplest form, includes a queue of events that are tied to a particular action or series of actions. For example, during a first visit to view the Leaderboard (an action), the user may see a Leaderboard Tutorial (the corresponding event). In game system includes an Event Handler 460 that allows for much more layered and nuanced action-event combinations. For example, during the Nth visit to the Leaderboard, award X bonus points. During visit N+6, display a social-media share option with an offered reward for Y bonus points, and upon completion of the share award Y bonus points.

In another aspect, the Event Handler 460 according to particular embodiments includes a user interface that allows an unskilled user or Admin to create, edit, modify, and update a wide variety action-event combinations without any technical programming assistance. The user interface includes access to a wide variety of assets stored in a library—such as stock-photo image of social-media logos with clickable links, and the like—for the user to choose from. The user interface also allows the user or Admin to populate an entire series of event-action relationships in a user-friendly format. The user interface, for example, may include a series of drop-down menus with options for actions, events, and the rules associated with each (including, for example, usage counters, time/clock counters, and the like). The Event Handler 460 takes the user input and builds a series of computing instructions, such as decision trees and the like, for use by the game.

Sets of Games

At one end of the spectrum, a single game created and played by a single user on a single occasion offers little in the way of useful information. At the opposing end of the spectrum, a set of related games, or a large superset of both related and unrelated games, created and played by multiple users, over an extended period of time, can be used to gather and harness a wide variety of useful and valuable information.

According to particular embodiments, the game system 100 is designed to facilitate the creation and play of a superset of games by providing a wide selection of different game types and templates and by providing a wide selection of game categories referred to as channels. The games in the superset may be filtered and searched by category, keyword, creator, or other characteristics. In one aspect, the game system 100 of the present invention includes a Leaderboard module for calculating and displaying leaders, by rank, and according to one or more settings or filters. For example, the Leaderboard module in one embodiment may be configured to display a ranked list of leaders globally (across all games), by game category or Channel (all TV-related games, for example), by "Games I Play" (across all games played by the current user), and by "Games I Manage" (across all games currently managed or otherwise administered by the current user). Also, for each filter list above, the Leaderboard module in one embodiment may be configured to display a ranked list of leaders that includes either Everyone (all players, globally) or "My Friends" (self-chosen friends of the current user). For example, the Leaderboard module in one embodiment may be configured to display a ranked list of leaders by game category or Channel (all home-improvement games), displaying My Friends only, by rank. In other embodiments, the Leaderboard module may be configured to display a ranked list of leaders using any of a variety of filters or groups, as described herein, including users who are members of identifiable groups (college alumni, age or age group, and the like) or users who are nearby or within a certain region (nearby and sharing location information; by country, state, city, or zip code) or users who share one or more distinct attributes (all who share a favorite sports team or musical artist in common, for example). In this aspect, the Leaderboard module of the game system of the present invention promotes deeper engagement between the user and the games by, for example, encouraging competition and inducing a user belief that the games are popular and an important aspect of social interaction. Moreover, the fact that the game system described herein promotes user interaction with both game content and with calls to action, such as surveys and other rewarded activities, further promotes engagement and increases frequency and duration of play. In this aspect, the game system described herein is greater than the sum of its parts, because the game system produces a superset of user-created and user-administered games, across a wide variety of game categories, in a way that encourages more participation and deeper user engagement than existing game-creation systems.

Social Reporting Engine

In another aspect, the game system 100, according to particular embodiments, is designed to facilitate the creation and play of a superset of games by providing a wide selection of game types and categories and by actively collecting user data across the entire superset of games using a module referred to as the Social Reporting Engine 500. The Social Reporting Engine 500, according to particular embodiments, gathers user data—including user behavior during registration and use of the game system, during game play, during related interactions (such as answering surveys and responding to other types of calls to action), and during social-media actions (entering likes, sharing content, and the like)—across multiple games, over an extended period of time, resulting in the population and updating of potentially millions of user data profiles, which may be stored in a user database 520.

User data includes initial profile data provided voluntarily by the user, typically beginning with the sharing of information already contained in a Facebook profile, Twitter account, Foursquare history, or other integrated third-party application. The game system provider may also gather user data by query or otherwise at any time during membership. User data also includes game performance, by specific game played; including, for example, whether the user makes accurate predictions in a particular sport, and whether the user consistently likes or prefers a certain product, service, or company. In a preferred embodiment, user data will be aggregated in order to derive business intelligence and other useful information in a manner that does not sell or disclose personally-identifiable information. The user data may be provided in an aggregated or anonymized format; however, such user data is valuable because the user data collected and stored by the game system of the present invention includes a variety of useful demographic information, combined with a history of user behavior within the game system and related activities, as described herein. This combination of demographic information and actual user behavior contributes to the value of the user data collected and stored by the game system.

Consumer Type Profile

The game system 100, according to particular embodiments, includes a number of algorithms that will identify and classify users into one or more Consumer Type Profile groups, according to a combination of both demographic facts and user behavior. The Consumer Type Profile will be similar to a personality profile, such as the Myers Briggs Type Indicator (based on the work of Carl G. Jung) and other personality tests. The consumer types may be grouped according to those who are motivated by price, by quality, by convenience, by brand loyalty, and other characteristics that may be obtained from the game system database of demographic facts and user behavior (during all kinds of games, and in response to calls to action).

Examples of user demographics and user behavior collected and stored by the system include the following characteristics: gender, age, age group, country, region; state; city; zip code; neighborhood, income, favorite media genres (and least favorite), favorite media content: TV, movies, games, videos (and least favorite), favorite reading genres (and least favorite), favorite devices (and least favorite), favorite teams (and least favorite), favorite musical tastes (and least favorite), favorite artists (and least favorite), favorite foods (and least favorite), favorite restaurants (and least favorite), favorite airline (and least favorite), preferred gaming devices (and least favorite), time spent online (web usage, mobile usage, apps usage), time spent in games (creating, customizing, deploying, administering, managing, scoring), time spent in game-related activities (time answering surveys and other calls to action, time engaging in social-media interactions), ratio of logins-to-completion of certain activities (viewing ads, engaging in social interactions, answering surveys and other calls to action), favorite brands, by vertical market, favorite products, by vertical market, favorite services, by vertical market, usage habits and routine (time of day, duration, device used, location), a "cool customer" score (an algorithm to rate users according to how much they participate and how deeply they engage with game content and calls to action), sentiment-related answer choices (every answer a user gives, in each game that collects user sentiment (i.e., user preference, like/dislike, etc.), becomes part of the user data stored for that user), predication-related picks (every selection or pick entered by a user, in each game that collects user predictions of real-world outcomes (i.e., sports picks, selection of talent contest winners/losers, prediction of reality TV events and outcomes, and the like), becomes part of the user data stored for that user).

In addition to the natural demographic affiliations, such as age, each user profile includes a variety of "chosen" affiliations such as favorites, likes and dislikes. Each user's behavior across multiple games represents not only his/her unique input but also reflects the input and activity of others who have similar affiliations. In this aspect, the Social Reporting Engine according to particular embodiments is configured to collect and store user data that includes natural affiliations, chosen affiliations, real game behavior, and all other information shared with the game system creates a plurality of user profiles that can be aggregated and analyzed to a high degree of granularity, revealing the preferences of specific sets, subsets, and micro-subsets of users (for example, revealing that college-football-related game players, aged 18-21, in the West, who prefer Apple products also prefer Nintendo game consoles over others by a 4-to-1 margin.

In the game system of the present invention, the Social Reporting Engine 500 according to particular embodiments not only stores a variety of user data but also creates links and associations between and among data points to form a detailed user profile. The associations built and maintained by the Social Reporting Engine 500 allow the game system to aggregate selected user data into groups, subgroups, and micro-subgroups, based on the user profiles maintained in a highly interactive and evolving database. In this aspect, the Social Reporting Engine 500 can delivery detail-rich reports, in graphical, tabular, and other formats, while permitting highly specific drill-down capability so the data can be parsed and analyzed to a high level of granularity.

The Social Reporting Engine 500 according to particular embodiments includes a Business Intelligence Reporting Console, which is a reporting interface where highly specific and targeted business campaigns can be managed (including game creation, game insertion, calls to action, links, and placement, etc.) and where highly detailed reports can be designed and generated. The Reporting Console, for example, may be used to selectively obtain user data for users who match a particular set of demographics, gathering each selected user's game performance (overall, by category, etc.), game-related achievements (points, currency, badges, bonuses earned, etc.), across multiple games, during a specific time period, for example. The resulting data set, using the Reporting Console interface, can be analyzed to reveal trends, activity, performance, and other metrics, by game, by category, by question type, etc., for each particular demographic subset of users in the sample. For example, a set of results may be analyzed to reveal that LSU fans are better than Alabama fans at college football prediction games, including (at a highly granular level) the fact that LSU fans are better at predicting the exact number of average yards per carry when the home team runs the football. The Social Reporting Engine 500 of the game system 100, according to particular embodiments, is configured to collect and store user data in accessible and relational databases such that results of this kind and level of granularity can be achieved and reported, in a variety of contexts, including for business customers.

Crowd Wisdom

In another aspect, the social reporting engine 500, according to particular embodiments, includes a crowd wisdom module for analyzing and ranking predictive answers, by subject, over a predetermined time period, in order to identify the crowd wisdom about a particular subject. In use, the module may identify the most correct or wisest subset of predictive answers about a subject, and report the wisest subset to a customer.

In this aspect, the crowd wisdom module is tasked with exploring a particular subject (sports, movie awards, and the like), identifying the best predictions about the subject, and analyzing those predictions over a period of time for consistency and accuracy. Because the game system 100 includes a large number of players, across multiple games, over an extended period of time, the best predictions (consistently accurate, over time) represent the best or wisest collective knowledge, or crowd wisdom, of all the players who use the game system. In the commercial context, the crowd wisdom has value because it represents actionable business intelligence that is useful in a variety of contexts.

Crowd Guru Finder

In a related aspect, the social reporting engine 500, according to particular embodiments, includes a crowd guru module for analyzing and ranking predictive answers, by user and by subject, over a predetermined time period, in order to identify an expert subset of users (i.e., the crowd gurus) about the subject. In use, the crowd guru module may identify an expert subset of users who are entering the most correct or wisest subset of predictive answers about a subject, and report the identity or those gurus in the expert subset to a customer.

In this aspect, the crowd guru module finds those users who make the best predictions about a particular subject (sports, movie awards, and the like) and identifies each such user as a Crowd Guru. According to particular embodiments, each user's predictions are analyzed over time for consistency and accuracy. Because the game system includes a large number of players, across multiple games, over an extended period of time, the users who make the best predictions (consistently accurate, over time) may be identified as Crowd Gurus about that particular subject. In the commercial context, the game selections and predictions made by a Crowd Guru, or a subset of Crowd Gurus, has value because it represents actionable business intelligence that is useful in a variety of contexts. The crowd guru module will score users on the accuracy of picks, in specific verticals, and aggregate the picks made by the top experts (the Crowd Guru performers who are members of a rolling list, based on most-recent results), analyze the data using the Social Reporting Engine 500 and other tools, and use that data to generate Crowd Guru data for commercial sale, presented for example in the business intelligence reporting console, described herein.

The crowd guru module, according to particular embodiments, is configured to identify the best-performing users in each game category, by aggregating scores over time, by category or by other selected metric, and maintain a rolling subset of top performers based on consistency. For example, the Top 5% Predictors of College Football Outcomes, the Top 2% Predictors of March Madness Division Winners, and the like.

In this aspect, the game system and social reporting engine 500 may be used to identify: (a) the Crowd Wisdom related to a particular topic, and/or (b) the Crowd Guru performers, based on their actual game performance across a subset of games about the topic. As described herein, this data may be commercially available as business intelligence to relevant industries (sports picks, movie awards, industry awards, global events, and the like).

In a related aspect; in order to reduce the influence of specific match-ups in a particular game, the game system in particular embodiments will present randomized seeds of the same bracket, multiple times, in order to generate more reliable user scores and, thereby, better identify the Crowd Guru performers. For example, the seeds in a particular bracket may be randomized and presented multiple times, according to the bracket size, the game type, the number of individual seeds, the number of participating players, and other factors. Bracket statistics and mathematical models may be used to calculate and select the number of plays required to obtain reliable results.

Unlike existing tools sometimes referred to as prediction engines, the crowd wisdom module and crowd guru module will be based on actual game performance.

Game Templates

The system 100 described herein, according to particular embodiments, may include a number of specific game types offered in a form-based or template format, suitable for use by unskilled users, including but not limited to brackets, trivia, predictions about the outcome of real-world events, trivia and predictions in combination, and simple favorites selection.

Within and in addition to the above general game types, the game system described herein may include the following specific games: a bracket-style game called BracketPop, and a Product Game for post-sale activities such as providing user instructions and/or a registration interface.

Bracket Pop

BracketPop is a game that includes a superset of many, many bracket-style games on any of a variety of topics. One object of the game is to create and play as many bracket games as possible in order to generate a desired rank on the Leaderboard, described herein, and to acquire virtual currency such as coins and other rewards for use and redemption by participation in auctions, raffles, and purchases of actual products and services.

According to particular embodiments, BracketPop is a set of games designed for use in marketing, research, lead generation, and user data-gathering activities. BracketPop facilitates the delivery of highly-targeted marketing campaigns, focused on specific groups of game players, using bracket-style games that are designed for deep user engagement and are created by or on behalf of subscribing customers. Any of the bracket games in BracketPop may include a call to action, such as an invitation to take a survey, view an ad, subscribe, opt-in, download an offer, like or share a page, make a purchase (buy now or rent now), enter a contest, and the like. BracketPop may also include a Social Reporting Engine 500, as described herein, which captures demographic information and user behavior data in a useful and accessible database format.

According to particular embodiments, BracketPop is a game that consists of a superset of many individual bracket-style games. Each bracket game may include a customizable number of seeds and rounds—from one round and two seeds, to six rounds and sixty-four seeds, and all numbers in-between (including brackets with a non-standard or odd number of seeds)—and also including play-in rounds, where entry into a specific round is determined by one or more separate games (as happens in NCAA basketball tournaments and other use cases). For each bracket game, the user may select from among multiple content categories called Channels, or may create a new category (Channel). In general, each bracket game permits at least two types of scoring—popularity and real-world outcomes.

Each game or set of games may be limited to Private Group play or extended to Public play; with a micro-payments option for the Admin to keep games private or, conversely, to exceed standard limits on the number of users. The games are searchable and filterable by category (by Channel). The system may include Leaderboards for each game, overall and by Channel, with filters for friends, groups, profile affiliations, and overall (global). Filters by Channel may a show the Leaderboards for any one of a number of user-created Channels (e.g., "Television")—or within that group, such as a "TV Channel" but only the games that I play)—or further within that subgroup, such as "TV Channel" but only the games that I manage. The filter can be used to display Leaderboard for specific groups, such as everyone, friends (my friends only), group members, and/or affiliations (college, job, city, age, etc.).

Timing and scoring of questions and rounds may be manual or automated. Automated scoring of questions and rounds via pre-scheduling and using popularity, or using an XML data feed and based on real world outcomes.

Looping of Games: When a bracket game ends, the game system according to particular embodiments automatically creates a copy of the game and re-publishes the game with randomly created matchups and a new version number. Looping may be limited to those games that exceed a popularity limit (by number of users, for example) and to those games that are sponsored (where a customer pays a fee for the Looping service). New matchups and bracket positions may be generated randomly or the user may be allowed to manually edit the game within an Admin interface (using drag-and-drop functionality, for example) in order to customize the new version of the game. The looping tool may be configured such that, after copying a game, the tool gives users the ability to randomize matchups, and/or the ability to customize graphics, descriptions, matchups and/or external links.

Users may access a reporting tool, for use when errors or other irregularities are discovered, to request removal and/or suspension of a game from live game play, at certain stages for moderator review and either correction or deletion.

Users may also request that a game or set of games be featured.

Voting on various aspects of game content—events, questions, answers—may be allowed as well. In this aspect, users may vote on possible entries and/or decide which objects are set in particular matchups. In this aspect of the game system, the user interface may allow friends to collaborate on seeding brackets or, alternatively, elect to use the game system to automatically seed the brackets first and then allow the Admin and/or select users to edit the bracket using an interface, such as drag-and-drop.

In addition, according to particular embodiments, BracketPop may include a variety of customizable features and functions for use by the game creator or Admin person. Some features may be made available to all players, while others are made available onto to players who unlock features by paying a micro fee (for example, 99 cents to unlock a feature), taking a survey or participating in another kind of call to action (watching a video ad, subscribing to e-mail updates, liking or sharing a page, and the like). One or more of the features described herein may be free or locked.

Custom features may include the ability for a user to upload custom game logo, to choose a bracket background image or color, to set a name for their game, to populate a bracket with seeds, to choose a number of seeds in their bracket game, to choose a number of regions, to choose a name for each region, to customize player titles in their bracket game, to lock your bracket so only those you have invited can participate, to set bracket as "friends only" so only your BracketPop friends can participate, to activate chat features for your bracket game, to lock a pick once it is made or allow picks to be changed, to show the pick breakdown by percentage across a select community (to be displayed after making a pick), and/or to display which friends picked which options after you have made your pick.

Tools may also be provided so that users can choose the Answer type (by right or wrong, or by popularity, for example). Custom features may also include tools that enable a user to set custom color for progress bar on game details screen, establish and use particular fonts on game details page (color and style), to add video or video links to the game details page, to add custom links to a game details screen that opens in new window (for example, links to Facebook page), to choose from a pre-designed template, to create your own game template and upload it. User may be able to activate or enable sub-questions and to choose how many sub-questions to allow, to enter the actual question for each sub-question, to enter the possible responses for each sub-question.

Custom features may also include tools that enable a user to set increments on how long each round of their game will last, to include a "friend slider" above your game that ranks all of your friends, to select custom fonts on bracket (color and style), to customize the name of points in their game (micro-bucks, moviepoints, etc.), to choose a bracket color, to choose a scoring system from a list of pre-designed scoring systems. Social media options include tools that enable a user to allow users to post comments, to allow Facebook sharing of picks, to allow bonus points for Facebook sharing, to allow tweeting of picks, to allow bonus points for tweeting, to allow bonus points from friend invites, to set keywords to help users locate your game, to select a Channel for your game, to enable winning streaks and bonus points for winning streaks in your bracket game, to allow users to connect their game to a data feed, to set a custom name for your bracket game, to upload a custom game logo, to customize the labels used for each box of the bracket (team names, company names, movie names, etc.), to set time increments on how long each round lasts (1 day, 3 days, 1 week, etc.), and to set the number of teams or matchups allowed in each bracket: 2, 4, 8, 16, 32, or 64 (and odd numbers, with optional play-in contests).

Custom features may also include tools that enable a user to manually end and score a round, or to have it score automatically based on popularity; to specify whether a user can change a vote after originally making a pick (or not); to specify whether to display a current pick breakdown, by percentage or otherwise, and when; to select whether to include a "friend slider" display associated with the game; and to add an additional, customizable content page (to promote user engagement, for example). Users may be able to pay a fee in order to remove advertisements from the display for a selected game.

Custom features may also include tools that enable a user to make point values increase as you progress into rounds (round 1 questions worth 10, round 2 worth 20, etc., where the game creator or designated Admin person may adjust the point values as desired). Users may select and activate an option for players to lose points for incorrect answers, and gain points plus a multiplier for correct answers—or to activate a scoring system where all correct answers give you points and all wrong answers subtract points. Users may activate a feature that presents random bonus questions (players will randomly gain extra points if they are correct). Users may activate a feature to set a maximum number of available points per bracket (brackets with more entries will be worth more). Those points would automatically be distributed across rounds (example: 1,000 points available and 4 rounds=250 per round; divided as evenly as possible across all matches in that round).

Custom features may also include tools that enable a user to activate a free or lower-cost option if the user does not want to rely on an incoming XML data feed of actual events. In this aspect, the game creator allows the manual management of sports brackets, for example (a) Export spreadsheet template to populate seeds and team colors; (b) Import spreadsheet of Teams to initially seed brackets; (c) Add scores to spreadsheet and re-import to score matchups. After each round, export new spreadsheet with only advancing teams to add scores and then re-import for scoring each round. This manual creation and updating method would likely use CSV files.

Custom features may also include tools that enable a user to establish custom titles for user rankings on a Leaderboard, to upload graphics for custom badges and identify when they should be awarded (upon which achievements), to choose from a concise display of your friends' picks or to display of summary display (a community percentage, for example). Players may also have the option to enable commenting in their game. Each individual matchup on the bracket has its own comment section. Sub-questions also have their own comment field. The creator of a bracket must have admin rights in the comment field. This allows them to delete comments within their bracket. This admin can be accessible through the Manage Brackets interface. Players may also establish custom titles for themselves and their games, and to determine how many tiers or titles there are and what the name of each title is.

Custom features may also include tools that enable a user to embed a game in a website—for example, in iFrame or by other similar means (white-labeled or with "powered by" credit). Users may allow friends to collaborate on seeding brackets and/or allow the game to have more than one Admin person.

A new game may be automatically generated based on popular chatter or other occurrences on social media and ranking or listing sites. The system may be configured to scrape screens or tie into the application services 300 in order to sense or otherwise identify trending topics, and to use an algorithm to automate the creation of new bracket games.

In another aspect, a recommendation engine suggests games that are similar to ones the user has played in the past or those similar to stated interests in user profile. An optional auto-pick feature may be included, for users who fail or decline to make one or more picks before the time window closes.

Game content may include royalty-free content, public-domain content, or game content where users assert they own the rights necessary to allow use in the game. In most cases, the game content in BracketPop will include information, works, and/or media that are supplied by services such as Freebase, Factual, Wikipedia, BracketPop users, and other sources. Some game content may be freely licensed under the GNU or other licenses governing the use of royalty-free content.

BracketPop may display statistics for each game, how many voters made picks, and how many times the bracket has been copied. BracketPop may use an integrated display advertising platform such as Criteo. Where there is not good description in pre-populated items in a new or copied bracket game, allow the users amend or add one that applies to their bracket game only (as do any other edits they make to standardized content). BracketPop may show a list of related games that one user is currently playing or recently finished making picks for. BracketPop may includes a file-picker plug-in, a Flickr integration, and an upload-from-machine option or URL tools for importing game content, along with the tools such as tag with keywords, preview, save for later, and publish.

The user profiles in BracketPop may display the games created, games played, user interest, and/or an avatar for the user. Users may purchase private games or establish their own private game channel.

Navigation and Pages:

The top navigation for the BracketPop game system, according to particular embodiments, may include a logo that also serves as a Home button, a My Brackets list, a Create button, a Leaderboard with filters, a list of Channels, a Help button, a Mini Profile, and a Settings button.

The My Brackets list may display a list of the bracket games created by the current user, along with a list of brackets created by others in which the current user has participated. The Create button may be used to start a new bracket game project. The display may include a single Leaderboard with a variety of different filters, allowing users to view the global leaders, the leaders in a specific game, the leaders in a specific Channel, and the like. A list of Channels or categories may display a list of games associated with each Channel. The Help button may lead to a simple content page with answers to FAQs. The Settings button may expand to reveal a list of options such as Logout, Invite Friends, Link to Facebook Account, and Feedback.

The Mini Profile may include the current user's profile picture, score, title, global rank, and other personal information. The Mini Profile may be displayed in a small window, located in a particular location, and it may remain displayed regardless of which page is viewed.

The Home page may serve as the landing page for players as they enter the system or a particular game. The Home page may include a Hero graphic, a list of available games, a Create button, and an Invite button. The Hero graphic may include a list of featured games and may display a question, a game description, and a Play button. A featured game may include a brand logo or trademark, a graphic image, and a game description. The list of available games may include a display of the question, the publishing date, and the Channel.

The My Brackets page, according to particular embodiments, displays the bracket games in which the current user has participated, including games that are live, pending (under construction), or closed. The list of bracket games may include a filter tool to help players locate a bracket. Filters may enable players to sort by game title, game status, channel, creator, and the like. Game status indicators may include Live, Pending, Closed, or All. Creator indicators may include My Games, Friends' Games, and All.

The Channels page may display a list of games that are grouped into categories called Channels. Sample Channel names include sports, music, movies, TV, fashion, and miscellaneous. Clicking on a Channel name may display a list of all games in that Channel (i.e., a single-channel view) which may be sorted by publication date, for example. Games may be filtered by Channel name, or by Game Status. For each game listed, the display may include a game logo, game title, game creator identifier, one or more game questions, and a game progress indicator (such as a meter displaying the current round or other progress measure). Players may click a Play button beside each listed game that is Live or Pending. Once completed or closed, the Play button is replaced with a Results button.

The Leaderboard page may display a single Leaderboard that ranks players based on game scores, and may be accessed by using a Leaderboard tab in the top navigation and/or by using a Leaderboard link associated with each specific bracket game. Leaderboard first-level filters may include Global, Per Channel or Per Game. Second-level filters for further refining the display may include Game List or Channel List, Friends or Everyone. The Leaderboard display may include data such as player name, rank, title, accuracy measure, points earned, and scores.

The Bracket View page may display the bracket associated with a selected game, including all the seeds in the game, organized in various matchups. The bracket may include the status of each matchup, including dates, team names with seed, and scores.

Scoring:

According to particular embodiments, points are earned by making correct picks on any bracket within BracketPop. Points may not be awarded until the round ends and results are in. In a popularity bracket, points may be earned at the end of a round if you picked the most popular seed. A round ends on the date and time specified by the game creator. Alternatively, the bracket creator can manually end the round.

Players may be given a title based on their performance. Sample titles include Lucky Guesser (zero to 9 percentile rank), Perceptive (10 to 19), Intuitive (20 to 29), Predictor (30 to 39), Forecaster (40 to 49), Enlightened (50-59), Sage (60 to 69), Prophet (70 to 79), Seer (80 to 89), Oracle (90 to 95), and Omniscient (96 to 100).

Game Play:

According to particular embodiments, players may click on a matchup in a bracket display in order to view a matchup screen and make a pick. A pick may be irrevocable or not. After a pick is made, data about picks by other may be displayed. Players may be given an opportunity to share a pick. Game creates may score bracket games round by round, awarding points at the end of a round.

Users may have access to a content library that includes all of their previously accessed content, which allows each user to easily build or re-build a bracket game. A content library may include images, logos, custom images, skins, thumbnails, photographs, and other graphics.

According to particular embodiments, players may share information about a game using any of a variety of social media applications.

Product Game

The game system, in another embodiment, may include a Product Game for post-sale activities such as providing user instructions and/or a registration interface. The Product Game may include a Customer Retention game widget that is designed to teach users how to assemble, install, operate, troubleshoot, and register ownership of products, in a game-based format. Users who complete the game and self-report having successfully completed the task receive a reward, such as a rebate, a coupon for future purchases from same brand and/or partners, or another item of value or perceived value.

For example, the buyer of an infant car seat may be presented with a Customer Retention game widget that includes detailed instructions in a variety of formats for safely installing the seat in a vehicle. The game widget may include step-by-step instructions, for a variety of vehicles, while also conveying important safety information to the consumer. Informing the consumer about how to safe install and use a product not only promotes safety but also mitigates risk. The game widget may include periodic insertions or notifications, informing the user about a reward for completing the game or reaching certain milestones within the game; for example, the user may be told that a coupon will be available at the end of section one, and a product rebate will be available at the end of the game.

The Customer Retention game widget, according to particular embodiments, provides the business user with automated, games-based tools for providing customers with instructions and product support, in a variety of formats (text, video, images, links to external content, download-ready and printable PDF, and the like).

The game also provides tools for customers to self-report knowledge and success as they move through the installation, using the game widget, to completion. A successful installation experience helps create "brand evangelists" for the product. Giving users the ability to post social shares of successful completion, including photo uploads and testimonials, helps inform others about the product.

The game may also include an optional in-game chat for assistance from company or from the crowd (fellow owners, friends). Higher success rates and safer installations mitigate risk and lower liability risk, while improving customer satisfaction. The game may be used to drive more social likes, follows, subscribers, shares and/or sign-ups—and the business gets a valid e-mail address and/or social login information (including demographics). The game may also include product warranty registration.

In another aspect, the game may be integrated with customer relationship management software and marketing automation software, along with a rules-based tool for automatic loading of the product owner. The game may also be integrated with a loyalty and rewards programs, and with market research and consumer insight tools.

For the consumer, the product game, according to particular embodiments, provides a fun way to learn how to install and use a product or service and clear instructions about how to accomplish task at hand, in a games-based format. The product game may include a feedback tool, show owners information posted by others, and provide access to an owner's community resource. The product game may also include a reward for completing the game and/or in-game rewards that become redeemable after user completes certain pre-defined steps, with opt-in opportunities to like, follow, subscribe, share, or sign-up, in exchange for an increased coupon or rebate value.

Game Component Attributes

The questions in a game application may be independent of, or related to a real-world event or its outcome. Each question in a game may be configured using primary attributes and optional attributes.

According to particular embodiments, the primary attributes of a question may include Answers, a Content Source Identifier, a Score, a Status (pending, in progress, closed, completed), and a Correct Answer. The correct answer of a question can be defined in different ways. First, the correct answer may be preset in the system and shown to users once the question is completed. Second, the correct answer may be currently unknown (for example, the outcome of a real-world event in the future) and will be set when the result is available. Third, the correct answer is based on popularity (including the popularity of participants or outcomes of a real-world event). Users may select from a set of possible answers, and after the question is closed the answer most-selected by the users is the correct answer.

According to particular embodiments, the optional attributes of a question may include a Start Date and an End Date. For a start date, the game system can make the question available for the game automatically, changing its status when a certain date or time is reached. For an end date, the game system can set the status of the question as "Completed" at a particular date and time.

The answer in a game application may be independent of, or related to, a real-world event or its outcome. Each answer in a game may have attributes that include a Related Question, and a Content Source Identifier.

The prediction (i.e., the answer selected by a user) in a game application may have attributes that include a Related Question, a Selected Answer, a User Identifier, and a Prediction Status. Each predication or selected answer may include a reference to a related question, a reference to a selected answer, and/or a reference or another identifier associated with the user. The prediction status defines whether the correct answer is known. The predication status may include indicators such as Pending, Processed, or Completed. For a Pending indicator, the user selected an answer, but it is currently unknown whether the selected answer is correct or incorrect (e.g., the real-world outcome has not yet occurred). For a Processed indicator, the results of the prediction is "on" or active, and the user can determine if her selection was correct. For a Completed indicator, the prediction or selected answer is processed and scored.

Each Event represents one or more elements of a particular game. An Event may be related to one or more questions, or sets of questions; in one or more games, or sets of games. For example, the Event may have one of the following representations within the platform. For sports games; a specific contest between two teams. For bracket games; a specific bracketed contest or event. For prediction games; a trivia question. For educational games; a quiz. Like the attributes of a Question, the Event may include attributes that manage its Status, Start Date, and End Date.

Self-Service Game Platform Features

The game system platform, according to particular embodiments, may include one or more of the following features.

The platform facilitates the creation and management of games, including the granting of permissions and rights to users who create and manage the games. Game templates include basic question-and-answer, trivia, predictions, brackets, popularity, lead generation, customer retention, warranty registration, and brand evangelist rewards games. The system facilitates game deployment across any of a variety of devices and platforms, including ready-to-use code for deploying the game on the web, mobile web, social media, and/or deploying the game as a stand-alone app for smart TVs and mobile devices.

An integrated enterprise Content Management System (CMS) 200 (see FIG. 1) for the creation, editing, and management of game content and related content, with SSO (single sign-on), market research tools, ad servers, market research and analytics software, and integrations with customer relationship management systems. Integrated payment systems, ad networks, daily deals, streaming video, Q-Codes, coupons, warranty registration, rewards programs and branded content.

Graphical editor to allow the user to create custom layouts and game skins with customizable templates for modifying items such as background colors and images, links to be included, client logos and trademarks, embedded videos and images, social media hooks, advertiser logos, and client content (questions, answers, surveys, calls to action, etc.).

Configurable scoring systems, badges, levels, achievements, titles, avatars, and the like, along with scoring-related tutorials, notifications, social media announcements, and related features. Built-in scoring of real-time events, using incoming data from external data sources 380 (see FIG. 1) such as XML data feeds and/or incoming instructions controlled by a browser-based administrator, with extensible rules.

Integration with existing web, mobile web, and/or social media presences; sub domain with DNS redirect for website based games; games appears directly on customer website, directly within a tab of Facebook or other social networks profiles, or as a stand-alone app that is available through app stores and mobile marketplace providers or smart TVs, and/or integrated with existing mobile websites.

Deep social media integrations such as via Facebook Connect and Open Graph, including integrated social likes, shares, follows, subscription, sign-ups, and the like. Authentication via Facebook Connect or Email/Password or SSO service, with automatic permissions and import of friends via social media integrations. Each game created may be assigned a unique URL. The system may also permit push notifications.

Group chat and a one-to-one (1:1) messaging integration. Play versus crowd and/or play versus game itself, including group play options.

Data warehouse with reporting interface for custom report development and data exports. Business intelligence reports, including game traffic, analytics, ads, ad views, in-app purchases, click-through paths, etc., provided through a social reporting engine 500 (see FIG. 1).

Split-screen capabilities so users can watch live TV while playing a predictions game related to on-air content.

Capture a location check-in (via a proprietary check-in tool or via data from third-party integrators), and then display a predication game based on the user's location, inviting the user to make a prediction about an event outcome (for example, the system may be configure to present a prediction game when a user checks-in at a baseball game).

Provide the game creation service as a web-based SaaS (Software as a Service) in which a Game Admin user has authority to create games, launch marketing, research, and lead-generation campaigns, and view business intelligence reports. Also provide app-level versions of the Admin portal, for use on tablets, phones, and other portable devices.

Enable the automated creation of games; from existing templates and/or by copying the format of existing games, for example.

Featuring customizable questions, answers, scoring methods, timing of rounds, scoring of rounds, seeds, head-to-head matchups, background colors, images, videos, descriptions, external links, logo displays, and social media integrations.

Provide access to multiple sources of third-party content via API integrations, XML data feeds, data dumps/imports, screen scrapes, crowd-generated content, brand-generated content (made available by other business customers), and the like. Provide a wide array of multiple content categories, and allow the user to create new and customized content categories. Enable at least two basic types of games—Sentiment (predication, popularity) and Prediction (real-world outcomes, picks).

Enable the master administrator to mimic any user and observe the game from that user's point of view. Allow admin control for play by private groups (of any size or membership) or the public at large), including the micropayment option for the ability to make games private or to exceed predetermined user limits.

Generate, update, and display a Leaderboard for each game, each channel (by category), and overall (across all games in the system, active and/or inactive), with filters for friends, groups, profile affiliations, demographic affiliations, "chosen" affiliations such as likes, and overall.

Automated scoring of questions and rounds via pre-scheduling and using popularity, or using an XML data feed and based on real world outcomes. Integrated contests, auctions, raffles, rewards, and prizes—including the implementation and use of virtual currency, such as coins or tokens.

Allow the user to establish and develop an extensive user profile, starting with profile data acquired from third-party integrations (Facebook, Twitter, and the like), and allowing the user to add affiliations (hometown, favorite team, favorite brands, favorite products, and the like). In this aspect, as described herein, each user and her game activity may be configured to represent both herself and her affiliation(s).

Include a Social Reporting Engine 500, as described herein, to gather and analyze user data, including user conduct during games and game performance, in association with demographic data and user-chosen affiliations, to create reports. Reports may include cross-references to any of a variety of combinations of user affiliations (demographic and user-chosen), specific game performance, and/or aggregated game performance in all games and/or in select games and categories.

Features for Users

The game system platform, according to particular embodiments, may include one or more of the following features for users, including the ability for a user to simulate the experience of other users (example: a client can simulate the log-in of User A, so they can view the User A experience). Show which friends are already playing, as part of initial game registration, and prompt the current user to invite others. Include the ability to click on a user (anywhere; on the Leaderboard, friend list, etc.) and view that user's profile in order to see their badges, scores, ranking, etc.

Include the ability to appoint another user as "co-Admin" in your game so that they have admin rights and can customize or co-create the game. Allow an authorized reseller or agency partner to collaborate with a client user on game creation and management, in a managed workflow environment. Include chat regulation for Admin and creators, so they can remove inappropriate comments made by other users in their games, as well as choose whether or not to enable chat in their game. User Management: allow Admin or client to add, delete, update, and modify users (to delete a user, for example, or promote a user to act as Admin).

Provide a widget for users to create an avatar, including the ability to update the avatar display based on the user's general mood, with optional ability to allow Admin to update avatars. In this aspect, the avatar provide a visual indicator of the user's mood or state of mind. The game system includes a variety of templates or stock avatars to choose from, plus an application to create an avatar from scratch; in thumbnail or larger version. The game system integrates and coordinates the appearance of this game system avatar with those avatars appearing in other applications including social media sites.

Display "recent badges" on home page, with "recent badges" defined as the "last 3 badges earned." Click an available badges link to display a list of all available badges, as opposed to a shortened list that is displayed by default.

Features for Prediction Games

The game system platform, according to particular embodiments, may include one or more of the following features for users, including the ability to lock additional bonus questions so that they cannot be answered without taking a survey or completing another type of call to action. Allow players to earn a "season pass" to automatically unlock all content, by completing a survey or other call to action.

Allow players to send a one-to-many challenge, challenging multiple users for the chance to win or lose more points. Establish a limit on the ability of users to change picks. Require the user to spend additional picks when changing a pick. Update the limit on picks back to a maximum predetermine number at a specified time each day; e.g., at midnight. Limit the number of picks that a player can make, which restricts the number of bracket picks and/or questions they can answer. Allow users to increase their maximum number of picks by making a purchase. Allow users to make a purchase (with credits, with virtual currency and/or points, etc.) in order to increase or "refill" the number of picks available. Allow players to watch a video or complete another call to action, in order to increase or refill picks.

Lock specific questions until a specific date/time is reached. Lock specific questions when a specific date/time has passed. Present players with questions organized in a quiz format, one at a time; grading the quiz upon completion. Allowing users to unlock higher-level content after they have completed lower-level content.

Features Related to Content

The game system platform, according to particular embodiments, may include one or more of the following features specifically related to game content. In general, the system 100, as shown in FIG. 1, includes access to and interaction with external data sources 380, including external content sources 382 and external applications 388.

The game system may include the ability to add social media streams, including trending activity and friend activity. Display a feed of Trending Picks that are popular at that moment. Popular should be determined by the questions that have the most picks made, for example, within the last 24 hours. Display a feed of Friend Activity that shows all recent picks by friends, such as "the N most recent picks entered by Friends." Also include a display of comments made by Friends in the feed, such as "N comments made by Friends" When displaying a comment, the display may include both the actual comment and the related question or bracket. Display a list of the user's own Recently Made picks, such as "Your Last X Picks." Display of list of games that have Recently Ended; sorted by date, for example.

Allow custom background colors (home page, question list page), custom logo in navigation, custom background images, custom category icons for all questions, and the like. Allow the user to group questions into categories of related questions. All questions in a single category may have the same attributes.

Display a Past Picks list, allowing users to review their previous picks. Players may filter their previously-answered questions and picks, and receive updates about questions or games that have ended, and about questions or games that received new comments. Filters may include an Updates Filter (displaying games or questions that have recently ended or received new comments), an Ending Date Filter (display all questions and/or games, sorted by the date ended), a Recently Answered filter (display all questions, sorted by date answered), a Correct Predictions filter (display questions you answered correctly), and an Incorrect Predictions filter.

Allow users to unlock paid content for free, by reaching specific milestones and/or by completing surveys or other calls to action. For example, if a user invites twenty friends, a premium game template may be unlocked for free.

Features Related to Action Events

The game system platform, according to particular embodiments, may include one or more of the following features specifically related to action events, including a tool for presenting players with a contest entry pop-up notification upon entry into a game. Click a link to gain bonus points; may be limited to first-time users only. Watch a video or complete another call to action in exchange for bonus points; limited to first-time only. Gain bonus points by interacting with social media. Provide a tutorial for visiting a specific page for the first time (explaining the Leaderboard and its filters, for example). Provide a tutorial for completing a specific action (how to answer a question, how to share a pick, etc.). Award badges for completing specific tasks. Triggers for these badges vary. Display a popup with share features when new badges are earned. Display specified achievements in a Facebook ticker.

Features Related to Scoring

The game system platform, according to particular embodiments, may include one or more of the following features specifically related to scoring. In one embodiment, the score may include points earned for correct answers times an accuracy factor. Players may earn bonus points for making multiple correct picks, in a row, from round to round. The number of bonus points awarded increases as the number of rounds increases.

Rather than displaying and ranking players by points (raw scores), allow players to receive a rating based on a putting all points received through a "rating equalizer" formula. Social scoring where players receive bonus points for "beating" their friends. Leaderboard with a contest tab to display top players who are eligible for a contest. Leaderboard with a weekly tab that displays who is top in the specific week and resets at the end of the week. Leaderboard with a friends tab that displays your friends and their all-time scores.

Features for the System Administrator

The game system platform, according to particular embodiments, may include one or more of the following features for the system administrator, including the ability for an Admin user to upload custom game logo, set a custom name for their game, and otherwise customize the look and feel. The Admin may have the ability to lock a bracket so that only invited users can participate, or set a bracket as "friends only" so only your friends can participate. The Admin user may have tools that provide access to any of the options and features described herein.

For customers of a game system provider or designer, a customized Admin Portal may be provided to the customer for creating and managing games and game-like applications. Through this Admin Portal, the customer may identify Admin Users or Master Users who are authorized to access and control tools for managing customers, users, games, data collection, payment processing, analytics, and reporting.

Customer management tools may allow the Admin to add, modify, or delete users; obtain contact info; set game package details and billing; establish user roles; insert brand names or logos; insert advertising; process payments; set logins and passwords; obtain and manage DNS information; obtain SSL information or obtain certificates for security; and generate tracking codes for analytics.

User management tools may be used by the Admin for internal users, authorized resellers, agents, or other partners. The user management tools may be used to manage user roles and permissions, to imitate a selected user's experience (for support and other reasons), and to assign scores to users based on game behavior.

Games management tools may be used by the Admin to establish game type, set contest rules, select platforms where games are available (web, social media, mobile, smart TV, SMS, other), establish and maintain authentication methods (including social media sign-in, single sign-on, and discrete accounts), establish and maintain security, configure local check-in options, establish scoring parameters, manage the Leaderboards, enable or disable chat, manage game content, manage an editorial workflow interface for reviewing candidate game templates and game content, publishing games and game content, hosting games, selecting sounds and graphics, designing and implementing action-based in-app purchase opportunities, and inserting advertising.

In a related aspect, the self-service platform for the game system of the present invention, according to particular embodiments, may include a user interface that allows an authorized Administrator to design a game, place an order, and get the results—all with little or no interaction with the game provider or its personnel. For example, a game Admin may create a short survey or single-question game, choose the targeted user group, select a specific date/time window for conducting the survey, enter the question through the user interface, deploy the game, collect the responses (and all related user data) after the game is completed, and analyze the results.

Users and Use Cases

Games can be created and used by individuals or by businesses, for social uses and/or to generate revenue. In one aspect, the game system described herein may be used for digital marketing, market research, lead generation, the collection of business intelligence, and for other commercial applications. The games system has potential value to businesses because the games and game-related interactions produce deeper user engagement and, thus, can be used as tools for increasing brand recognition, brand loyalty, subscriptions, and other forms of user-to-business interactions.

Users of the game system, according to particular embodiments, may include consumers, company employees, authorized resellers, businesses (internally, B2B, and B2C), colleges and universities, and others.

Consumers include individuals who create and manage consumer-to-consumer games, either for fun or for social uses, or to generate revenue. Games may be developed by consumers who wish to rate, report, and otherwise comment on businesses in a game or game-like format. For example, a consumer may elect to create a game in which other users identify, for example, the "Best Wedding Photographer in Miami." The consumer may choose any of a variety of superlatives—best/worst, cheapest, friendliest, quickest/slowest, dullest/most creative—in any category, location, or other characteristic.

Company employees may use the game system for a variety of projects. According to particular embodiments, games may be developed by a game designer or provider and sold to a company for internal use among staff members. For example, the game system provider may develop and self-release select titles and rare games for delivery to select customers as part of a managed service. The game system provider may also build templates and create template-based games in a ready-to-use format for all types of users. As described herein, the game system provider (like any other business user) may use the game creation systems and methods described herein to generate revenue through advertising, data gathering, prompting users with subscribe options and IAP (in-app purchase) opportunities, and any of a variety of other commercial uses.

Authorized resellers or other agents may create and manage games for multiple customers.

According to particular embodiments, games may be developed by a business for internal use within the organization. For example, an internal game may be designed to gather input from staff or team members about which product to launch next, where to hold a meeting, and the like. In this aspect, games may be designed to produce results that help the business gain insight into the preferences, satisfaction, or other characteristics of a business unit or team within the organization. Games may also be developed for internal training and education purposes.

In a related aspect, games may be developed by a business for external use. For example, registered business users of particular products or services may be asked, for example, to identify best or worst performance areas, to provide feedback, to identify the most desirable future product or service, or to otherwise interact with the business. A business may also develop games, according to particular embodiments, directed to consumers, as described herein.

Game and game-like interactions may be designed to gather specific data; for example, to ask registered product owners for feedback or to prompt users to post a voluntary product review. Other games, as described herein, may be designed to facilitate warranty registration, to assist with product installation and/or maintenance, and to maintain registered owner contact information.

Other games may be designed for entertainment and general user engagement, with a marketing purpose. For example, a home improvement store may build a game that asks consumers to select the best remodeled kitchen or select the most attractive landscape project, or to take a quiz about a particular subject (water heaters, lawn mowers). Games may be designed to display advertising content, provide options to subscribe or like the business, offer IAP links (for In-App Purchases), and to accomplish any of a variety of marketing goals. In this aspect, a game with apparent entertainment value also provides an opportunity to display relevant content, offer incentives (coupons, discounts), and otherwise provide for deeper engagement between the game player and the business.

Still other games may be designed for market research purposes; for example, to identify and query a specific group of consumers in order to obtain feedback about a product or service. In this aspect, the game system as described herein may be used to conduct all types of market research, including those activities currently conducted by market research companies, but with deeper user engagement and with access to more detailed and granular demographic information.

Games may also be developed by colleges, universities, schools, and other institutions in order to promote deeper engagement with educational materials. In this aspect, the game system described herein may be used as part of games-based learning management system (LMS) in which students or other participants are invented or required to take quizzes or test, or interact with study guides using a game or game-like interface.

Benefits for Commercial Game Creators

The game system described herein automates and reduces the cost and time required to create, deploy, and maintain games that promote deeper, more frequent, and longer-lasting user engagement with both game content and calls to action.

In one aspect, when a user plays or participates, the game or game-like application produced using the game system delivers to business customers improved sales, revenues, customer acquisitions, sign-ups, opt-ins, subscriptions, downloads, brand awareness, brand loyalty, customer retention, social reach, social sharing, likes, follows, tweets, e-mails, customer education, learning, risk mitigation, liability reduction, analytics, data collection, content generation and second-screen experiences (related to linear TV), through the use of integrated advertising, marketing, data gathering for research, interactive connections to social media, and e-commerce features.

Deeper engagement and commercial benefits are realized when users interact with both game content and calls to action, including in particular embodiments business-created game content and business-designed calls to action. For example, the game content itself may include content directly related to the customer's business. The business user may create and insert any of a variety of calls to action, which may be integrated directly into the games. A call to action may include an incentive (such as an in-game reward of points, credits, badges, titles, level advancement, or other in-game acknowledgement) in exchange for the user undertaking and/or completing a specific action (viewing an advertisement, signing up or subscribing, completing a survey, liking a page, sharing a page or link to the game, and the like). Business-created calls to action, integrated into a game, can broaden the business's social media reach, add subscribers, identify sales leads, improve customer retention, and increase brand recognition and loyalty, among other benefits.

In the commercial context, advertisers, marketers, educators, and researchers pay a fee to use the game system described herein in order to create, deploy, and maintain games that drive engagement with their customized content and their specific calls to action. Any or all games created by a commercial customer may be related to any of their brands, products, services, and other content (in support of their business goals) and may be embedded directly into their own website or deployed on any other platform. The game system, according to particular embodiments, facilitates deployment across any of a variety of devices and platforms by automatically generating ready-to-use code for deploying the games on an existing web page, on a stand-alone micro-site for web or mobile, on a Facebook page, in a mobile app ready for deployment on a smart TV, an iPhone or Android device, or on any of a variety of other platforms. Games produced by the system described herein are feature-rich, including SSO (single sign-on), enterprise content management system (CMS), market research tools, ad servers, market research and analytics software, integrations with CRM (Customer Relationship Management), and the like.

Games may be designed for collecting user sentiment (popularity, likes, voting, preferences, recognition, etc.) and/or for predicting real-world outcomes (picks, brackets, identifying contest winners, and the like). Game types include question-and-answer, trivia, educational quizzes, and brackets.

CONCLUSION

Although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only, and should not be construed as limiting the described invention or the claims that follow.

The invention claimed is:

1. An interactive system for a plurality of game-like activities, said system comprising:
   a content management system comprising a plurality of game templates, a game content database in communication with a plurality of external data services;
   a plurality of application services, in communication with said content management system, comprising one or more game-like applications;
   one or more user interfaces to facilitate access to said plurality of application services for a plurality of users, comprising:
   (a) a first user interface for selecting a first game template from said plurality of game templates;
   (b) a second user interface for selecting a first set of game content from said game content database; and
   (c) a third user interface for deploying a first game-like application by inserting said first set of game content into said first game template; and
   a social reporting engine, in communication with said content management system, for collecting and storing user data, including demographic facts and game-play behavior, for at least a first subset of said plurality of users during a predetermined subset of interactions with said plurality of application services and for generating automatically an aggregate data set for the first subset of said plurality of users whom exhibit a prediction accuracy rate above a predetermined threshold over a predetermined time period.

2. The interactive system of claim 1, wherein said plurality of application services further comprises a query tool for searching said plurality of external data services for additional game content, and importing said additional game content into said game content database.

3. The interactive system of claim 1, wherein said plurality of application services further comprises an active game-play database, in communication with said third user interface, for storing interactions with said first game-like application.

4. The interactive system of claim 1, wherein said social reporting engine further comprises a type profile application for classifying said first subset of said plurality of users into one or more consumer type profile groups according to said user data.

5. The interactive system of claim 1, wherein said social reporting engine further comprises a business intelligence reporting console for designing reports about said aggregate data set, for secure access by one or more authorized users, and for filtering said reports according to one or more selected criteria.

6. The interactive system of claim 1, wherein said social reporting engine further comprises a predictive application for analyzing predictions and outcomes for said first subset of said plurality of users, comparing said predictions and outcomes to one or more other users.

7. The interactive system of claim 1, wherein said social reporting engine further comprises reporting the aggregate data set to a customer.

8. The interactive system of claim 1, wherein said second user interface further comprises a content query tool for searching said game content database.

9. The interactive system of claim 1, where said one or more user interfaces further comprises an administrative portal for managing, customizing, scoring, or updating said first game-like application.

10. The interactive system of claim 1, wherein said plurality of application services further comprises a leader-board module for displaying a list of users, by score, for a particular set of games selected from said one or more game-like applications.

11. The interactive system of claim 1, wherein said plurality of application services further comprises a game generation module configured to automatically develop ready-to-use programming code suitable for use on any of a variety of devices or platforms.

12. The interactive system of claim 1, wherein said one or more user interfaces further comprises an editorial workflow interface for presenting (a) one or more candidate game templates, selected from said plurality of game templates, or (b) one or more candidate game content items, selected from said game content database, for approval or rejection by one or more authorized game editors.

13. The interactive system of claim 1, wherein said plurality of game templates comprises a product game for educating a user about a product, informing said user about a warranty for said product, leading said user through an installation process for said product, leading said user through a particular use of said product, and registering said product.

14. The interactive system of claim 1, wherein said plurality of game templates comprises a product game for informing said user about a warranty for said product, a product game for leading said user through an installation process for said product, and a product game for leading said user through a particular use of said product.

15. The interactive system of claim 1, wherein said plurality of game templates comprises a product game for informing said user about a warranty for said product.

16. The interactive system of claim 1, wherein said plurality of game templates comprises a product game for leading said user through an installation process for said product.

17. The interactive system of claim 1, wherein said plurality of game templates comprises a product game for leading said user through a particular use of said product.

18. The interactive system of claim 1, wherein said plurality of game templates comprises a product game for registering said product.

\* \* \* \* \*